Feb. 12, 1963 H. G. ALLEN 3,077,161
CENTRIFUGAL PUMP
Filed March 23, 1961 4 Sheets-Sheet 1

WITNESSES:
Bernard R. Giegucy
Zygmund L. Fermer

INVENTOR
Harvey G. Allen
BY
ATTORNEY

Feb. 12, 1963 H. G. ALLEN 3,077,161
CENTRIFUGAL PUMP
Filed March 23, 1961 4 Sheets-Sheet 3

United States Patent Office 3,077,161
Patented Feb. 12, 1963

3,077,161
CENTRIFUGAL PUMP
Harvey G. Allen, Murrysville, Pa., assignor to Westinghouse Electric Corporation, East Pittsburgh, Pa., a corporation of Pennsylvania
Filed Mar. 23, 1961, Ser. No. 97,892
5 Claims. (Cl. 103—87)

The present invention is directed to centrifugal pumps and more particularly to an impeller arrangement which permits increased flow through the pump without subjecting the pump bearings to additional axial thrust.

More specifically, in many centrifugal pump arrangements, pump operation is limited by the amount of axial thrust placed on the bearings.

In many pump arrangements, axial thrust limiting means are provided to absorb axial thrust only in one direction. Such axial thrust limiting means or thrust runners are provided to absorb down thrust, that is thrust in the direction opposite to the impeller inlet flow. Where such unidirectional axial thrust limiting means are utilized, it is essential that the pump be operated so that the flow through the pump does not provide upthrust, or thrust in the direction of impeller inlet flow and such flow conditions provide the operation limits of the pump.

Normally a centrifugal pump is provided with a balancing chamber disposed on the wall of the impeller remote from the impeller eye. The balancing chamber is coupled to the interior of the impeller through openings in the impeller wall and a sealing means is provided at the edges of the balancing chamber to limit the amount of leakage flow therefrom. An impeller wear ring is disposed on the impeller adjacent the sealing means with the latter being formed on the pump casing. The diameter of the impeller wear ring is selected to vary the amount of unidirectional thrust to which the bearings are subjected. A variation of the wear ring diameter, however, does not operate to increase the maximum permissive flow through the impeller to any substantial degree. For purposes of this invention, the maximum permissive flow through the impeller is defined as the flow which does not create upthrust on the pump bearings.

The present invention is formed to increase the maximum permissive flow so that increased flow may be obtained before the pump bearings are subjected to upthrust. The increased operating flow is achieved through the provision of an impeller thrust ring in the impeller balancing chamber. The impeller thrust ring acts to increase the pressure in the balancing chamber thereby displacing the hydraulic thrust curve for the pump downwardly over the entire flow range and permitting increased maximum flow through the impeller before upthrust on the pump bearings occur.

The increased pressure in the impeller balancing chamber is accomplished in specific aspects of this invention through the provision of an auxiliary impeller located in the balancing chamber. The auxiliary impeller is formed by the thrust ring with its eye communicating with the interior of the main pump impeller and with its outlet communicating with the impeller balancing chamber. As a result the utilization of the impeller thrust ring causes the thrust curve for the pump to be displaced downwardly substantially equally over the whole flow range. The latter condition is accomplished inasmuch as the impeller formed by the thrust ring maintains a constant pressure increase over the whole flow range.

Accordingly, it is an object of this invention to increase the maximum operating flow point for a centrifugal pump without subjecting the bearings of the pump to increased axial thrust.

Another object of this invention is to provide a centrifugal pump impeller having a balancing chamber such that there is always a positive pressure differential between the balancing chamber and the impeller eye over the entire flow range.

A further object of this invention is to provide a centrifugal pump impeller having a balancing chamber coupled thereto with an impeller thrust ring which maintains a positive pressure differential between the balancing chamber and the impeller eye over the whole flow range of the pump.

A still further object of this invention is to provide a centrifugal pump having an impeller and a balancing chamber with an additional impeller having its eye communicating with the main impeller and having its outlet communicating with the balancing chamber.

These and other objects of this invention will become more readily apparent upon review of a detailed description of the illustrative embodiments of this invention taken in conjunction with the accompanying illustrations in which:

FIGURE 1 comprises a longitudinal sectional view through a motor pump unit;

Figure 7:
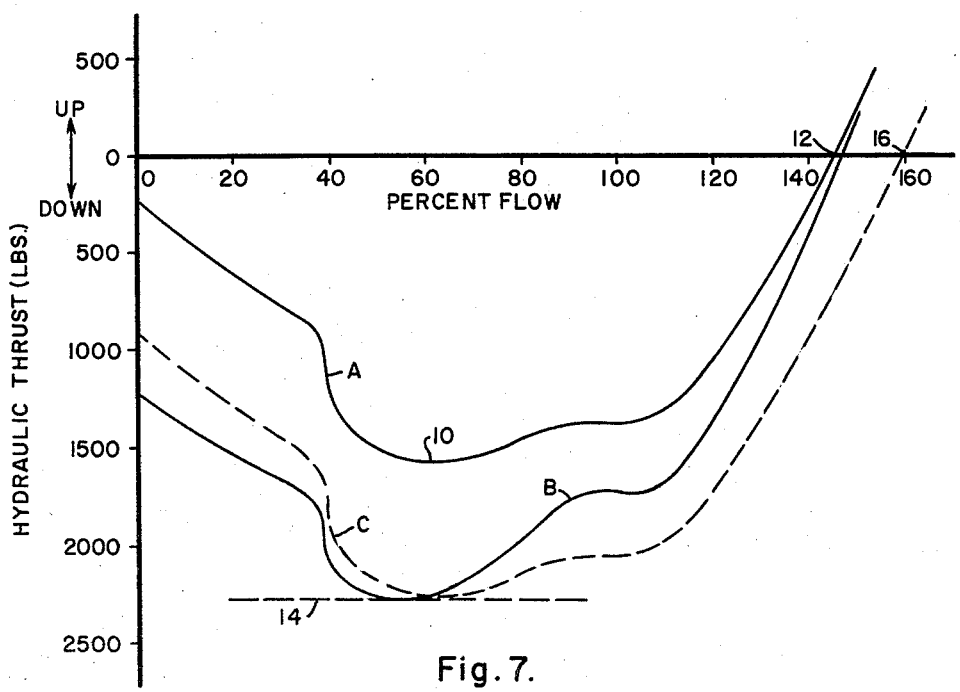

The flow versus thrust conditions in a centrifugal pump is illustrated in detail in the graphs of FIG. 7. This figure illustrates effectively the advantages of the instant invention and simultaneously points out the limitations of the prior art arrangements. Referring specifically to FIG. 7, it will be noted that graph A illustrates the normal hydraulic axial thrust in a centrifugal pump with varying flow through the impeller. From graph A it will be noted that the axial thrust on the bearings of a pump is in the downward direction to a maximum value at point 10 at a given flow rate and then decreases in the downward direction as flow increases until the direction of the thrust reverses at point 12. A given bearing has associated therewith a maximum thrust which is capable of withstanding as exemplified by the line 14. Inasmuch as a prime goal in the design and construction of a pump is to increase the maximum permissive flow through the pump, attempts at this goal have been made in accordance with the prior art by adjusting the diameter of the impeller wear ring. With such adjustments, the balancing chamber of the pump is varied in size through variation of the wear ring diameter so that the downward thrust on the pump bearings reaches a maximum value 14 as illustrated on curve B of FIG. 7. It will be noted, however, that in varying the wear ring diameter, the maximum allowable flow through the impeller is not increased substantially. For example, the crossover point of curve B for up thrust is only a few percentage points greater than the point 12 on curve A.

In accordance with the invention a positive pressure differential in the downward direction is provided on the impeller of the pump throughout the entire flow range.

Accordingly, a thrust to flow curve as shown in curve C of FIG. 7 results.

It will be noted that the crossover point 16 on graph C provides for aproximately 10% increase in flow over the characteristics of a pump constructed in accordance with graphs A and B. A positive pressure differential is formed in the balancing chamber of the impeller through the provision of an impeller thrust ring in the balancing chamber which forms, in effect, a centrifugal impeller having its inlet coupled to the eye of the main impeller and having its outlet coupled to the balancing chamber. With the impeller thrust ring, it wil be noted that the maximum downthrust is placed on the bearings of the pump so that the bearings are utilized to substantially their full capacity, but that upthrust does not occur at the relatively low flow rate of the prior art devices.

With this arrangement the diameter of the wear ring no longer remains critical with respect to the thrust crossover point. Thus the wear ring diameter can now be selected on the basis of obtaining the flatest possible thrust curve since the thrust level will be controlled by the impeller thrust ring. In addition, the hydraulic thrust level can be easily controlled by merely adjusting the outer diameter of the impeller thrust ring. In the past a hydraulic thrust change required modifications such as reboring the pump casing and shrinking rings onto the wear ring in order to increase the diameter thereof.

Figure 1:
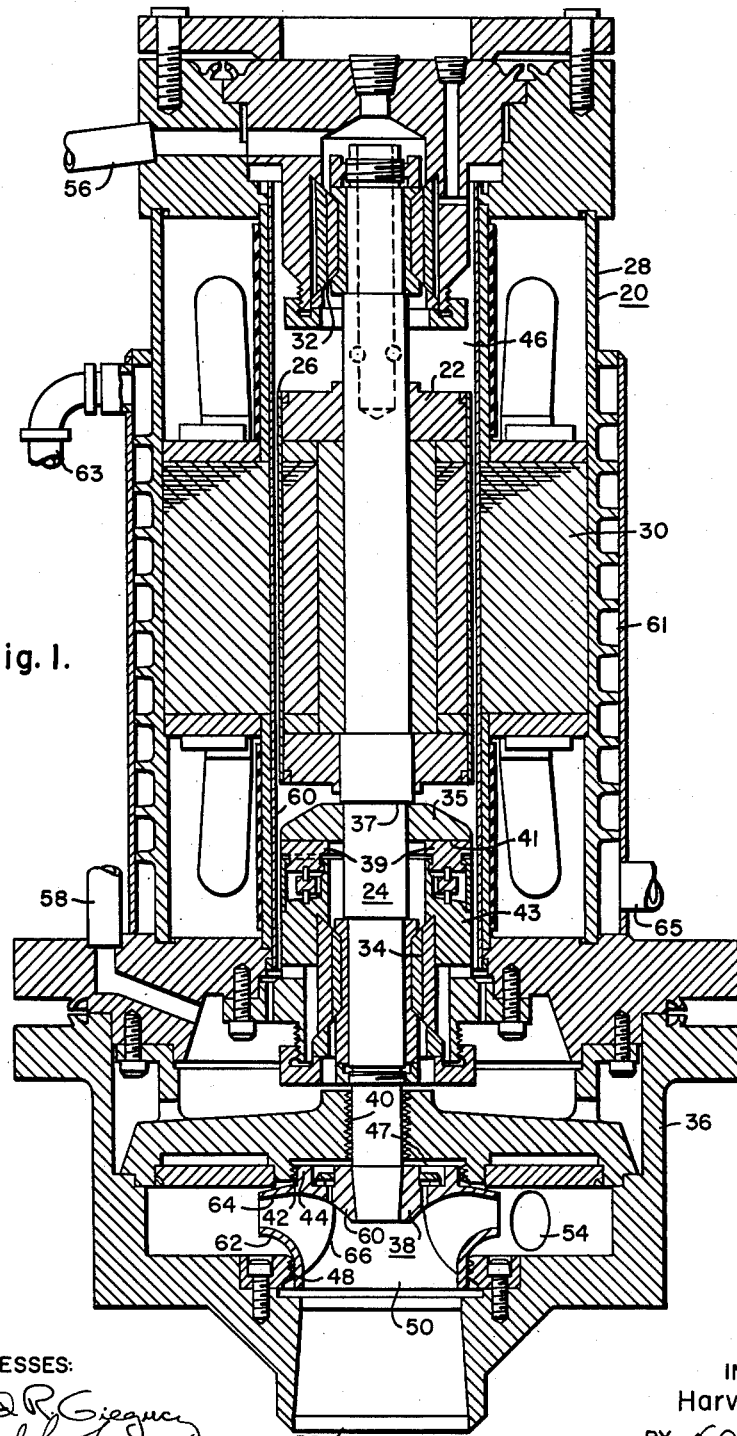

This invention is illustrated in its specific aspects in conjunction with a pump of the canned motor type wherein the rotor cavity of the motor is hermetically sealed with respect to the stator, The impeller of the invention is illustrated in FIG. 1 in conjunction with such a motor pump unit indicated generally by the reference character 20. In this application of the invention, a windingless rotor 22 is mounted upon a driving shaft 24 and is hermetically sealed within the rotor "can" or enclosure 26. The aforesaid rotor and shaft are mounted for rotation within a motor housing 28 and coaxially of a hollow stator assembly 30, also mounted within the housing 28. The driving shaft 24 is supported adjacent its ends on suitable anti-frictional means, for example, the journal or sleeve type bearings 32 and 34. The driving shaft 24 extends to the lower bearing 34 and terminates within a pump casing 36, which is secured to the motor casing 28. The driving shaft 24 is joined to a main pumping impeller 38 which is mounted for rotation within the pump casing 36. In this arrangement the impeller is secured to the lower end of the shaft 24 by suitable means such as a shrink fit or by means of a mounting nut (not shown).

The shaft 24 is provided with an annular thrust runner 35 mounted thereon and secured thereto by suitable means as by shrink fitting. The thrust runner 35 is disposed to engage adjacent its upper surface a shoulder 37 formed on the shaft 24. Thrust shoes 39, of conventional design, are disposed to engage the lower surface 41 of the thrust runner 35 to cooperate with the thrust runner 35 to absorb downthrust created by a fluid flow through the impeller. The thrust shoes 39 are mounted on a structural portion 43 of the lower sleeve bearing 34 and such mounting of the thrust shoes is formed in any suitable manner not forming a part of this invention. The use of the thrust runner to absorb down thrust on the shaft 24 determines the maximum downthrust level 14 (FIG. 7) of the pump bearings.

Suitable labyrinthine seals 40 and 42 are mounted in the pump casing 36 at positions adjacent the driving shaft 24 and the wear ring 44 of the impeller 38, respectively. The aforementioned seals 40 and 42 are provided for the purpose of isolating pressure in the balancing chamber 47 disposed above the hub of the impeller 38, as will be explained. The labyrinthine seal 40 is employed also for the purpose of preventing more than a pressure-equalizing seepage of the material handled by the motor pump unit from passing from the pump casing 36 into the rotor cavity 46. When the rotor is immersed in a fluid maintained at elevated temperatures, such isolation of the seal 40 prevents the transfer of fluid from the pump casing to the motor section. In the case of slurry pumps, the labyrinthine seal 40 permits only limited flow to the pump casing 36 of a purging fluid employed to flush slurry particles out of the rotor cavity and associated components. In this example the purging fluid is derived from the rotor coolant which is supplied by means of conduits 56 and 58 and which is desirably the vehicle or carrier of the slurry being pumped. The coolant is maintained at a slightly higher pressure than that within the pump casing 36 to ensure that the purging flow will be downwardly toward the pump casing and not vice versa. A similar labyrinthine seal 48 is disposed adjacent the eye 50 of the impeller 38 in order to prevent the fluid leaving the impeller 38 from passing back into the stream of incoming fluid which enters the motor pump unit 20 through the pumping inlet port 52. The fluid handled by the pump is conveyed out of the pump casing 36 by means of an outlet port 54. When the motor pump unit 20 is employed in hermetically sealed systems, the inlet and outlet ports 52 and 54 can be seal welded into the system or otherwise hermetically sealed thereto, in a known manner.

In the operation of the motor pump, the rotor 24 usually is immersed, as aforesaid, in a cooling medium which is supplied to the rotor chamber 46 by means of conduits 56 and 58. The fluid thus circulated to the rotor chamber 46 serves to remove electrical losses in the form of heat from the rotor 22 and from the stator 30, which the coolant is permitted from contacting directly by means of a hermetically sealed stator "can" or enclosure 60. Additional, cooling is afforded the stator 30 by means of a water jacket or the like denoted generally by the reference character 61. A suitable coolant is circulated through the jacket 61 by means of the inlet and outlet ports 63 and 65 respectively.

Figure 3:
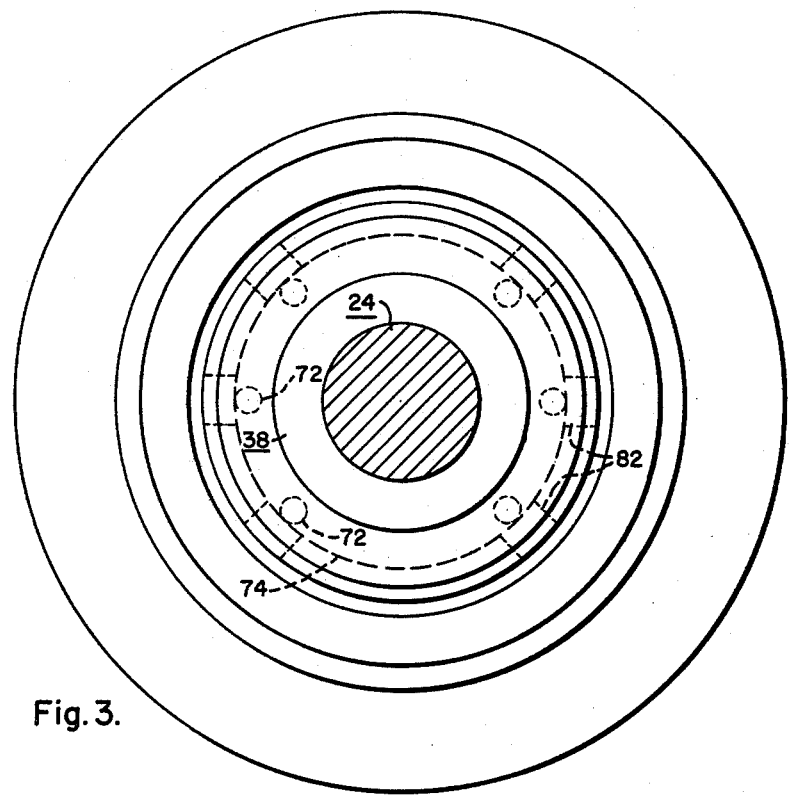
FIG. 3 is a top plan view of the impeller illustrated in FIGS. 1 and 2 and taken substantially along the line III—III of FIG. 2.
Figure 2:
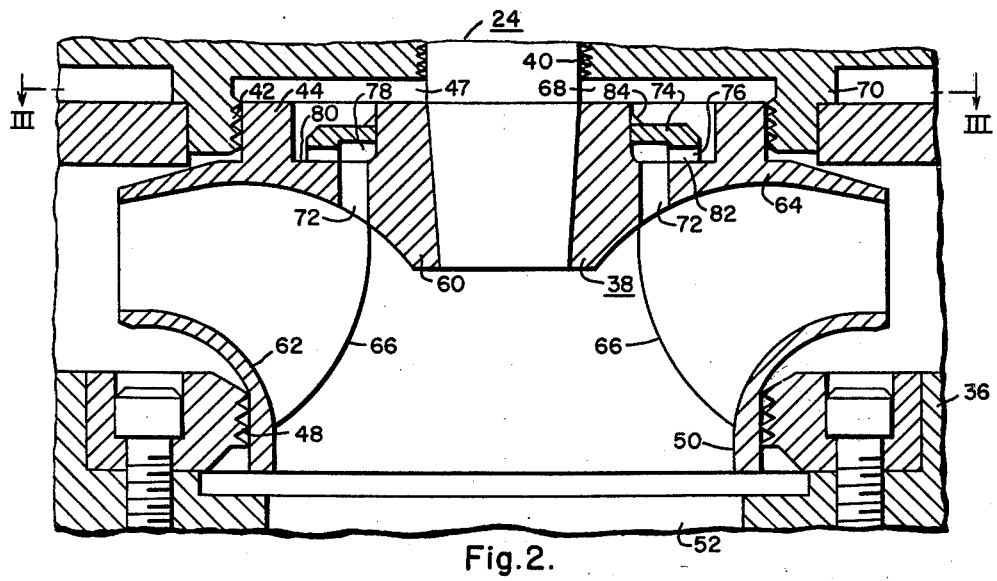
FIG. 2 is an enlarged sectional view of the impeller and balancing chamber of the motor pump unit illustrated in FIG. 1.

Referring now to FIGS. 2 and 3 of the drawings the impeller 38 of the invention is illustrated therein in greater detail. In addition to the impeller eye 50 noted heretofore, the impeller 38 comprises a central hub 60, a lower shroud member 62, and an upper shroud member 64. The impeller 38 includes a plurality of vanes 66 which extend laterally between the lower and upper shouds 62 and 64 and which are joined thereto.

The balancing chamber 47 of the pump is formed between the lower surface of an annular flange member 68 which forms a portion of the pump casing 36 and the hub 60 and upper shroud 64 of the impeller 38. The flanged pump casing portion 68 is provided with an annular ring 70 which extends downwardly toward the impeller 38 and having the labyrinthine seal 42 formed on the inner axial surface thereof. Similarly the labyrinthine seal 40 is formed on the inner axial surface of the annular flange member 68 adjacent the shaft 24 so that flow from the balancing chamber 47 to the remaining portions of the motor pump unit is minimized. The upper shroud 64 of the impeller 38 is provided with the upstanding wear ring 44 disposed in the balancing chamber 47 and juxtaposed to the labyrinthine seal 42. The outer diameter of the wear ring 44 is formed so that at least a running clearance between the wear ring 44 and the seal 42 is provided. A plurality of axially extending circumferentially spaced openings 72 are formed in the upper shroud 64 of the impeller and are disposed between the impeller hub 60 and the wear ring 44. A thrust ring 74 of annular configuration is mounted on the impeller hub 60 and disposed in the balancing chamber 47. The thrust ring 74 overlies the axial opening 72 in the shroud 64 and is provided with a downwardly extending circumferential portion adjacent the outer end thereof denoted generally by the reference character 76. The impeller 38 and the thrust ring 74 cooperate to form a generally annular chamber 78 with the chamber 78 being disposed to communicate directly with the axial openings 72. The extension 76 on the thrust ring is formed to engage flushly the upper surface 80 on the shroud 64 and is provided with a plurality of radial slots 82 extending therethrough and formed in the end of the projection 76 by suitable means as by milling.

The thrust ring 74 thus forms an auxiliary impeller disposed in the balancing chamber 47 with the impeller having its inlet created by the axial openings 72 and having its outlet formed by the radial slots 82. It will, therefore, be seen that a positive pressure differential always exists between the balancing chamber 47 and the interior of the impeller 38. This positive pressure differential is created by the pumping action through the auxiliary impeller formed by the thrust ring 74 and is independent of the pressure within the impeller 38.

The value of the pressure difference can be varied in at least two ways, for example, the value of the pressure differential may be increased by increasing the outer diameter of the thrust ring 74 thus making the slots 82 longer. The pressure differential may be decreased by decreasing slightly the outer diameter of the wear ring 44 to permit increased flow through the labyrinthine seal 42. Alternatively the pressure differential may be decreased by reducing the outer diameter of the thrust ring 74.

In the arrangement of the impeller wear ring 74 of FIGS. 1 and 2 it will be noted that the surface 80 of the upper shroud 64 and the lower edge of the extension 76 must provide a tight fit so that milling of the contiguous surfaces of the latter members is required. The thrust ring 74 is secured to the upper end of the hub 60 by suitable means such as through a press fit or by welding annularly at 84. However, different differential pressure characteristics of the motor pump unit 20 may be obtained merely by substituting thrust rings 74 having different outer diameters and differently sized radial slots 82.

It is to be noted that the positive pressure differential between the fluid balancing chamber 47 and the impeller 38 is created independently of the diameter of the wear ring 44. Accordingly the wear ring 44 and the annular projection 70 may be formed of an outer and inner diameter to provide the flatest thrust shape for the motor pump 20.

Figure 5:
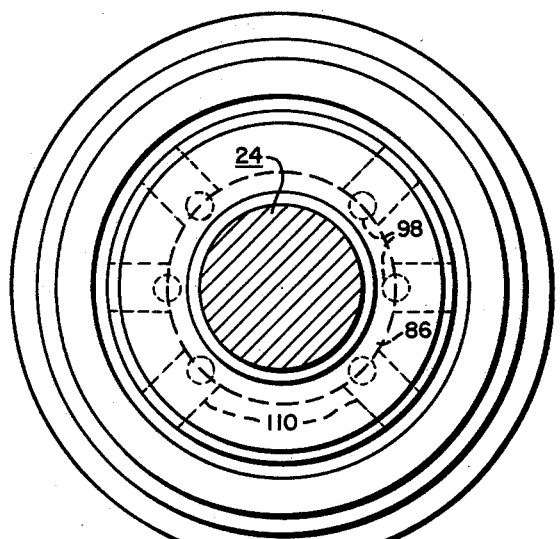
FIG. 5 is a top plan view of the impeller and balancing chamber shown in FIG. 4 and taken substantially along the lines V—V thereof.
Figure 4:
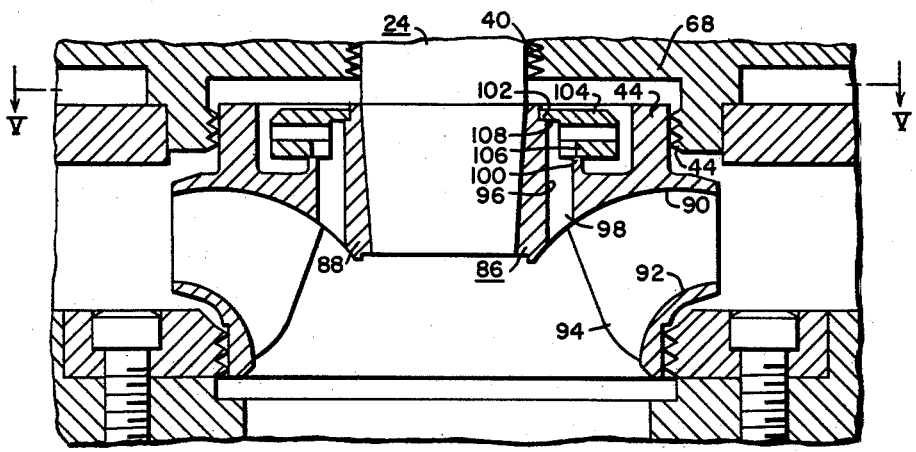
FIG. 4 is a sectional view of the impeller and balancing chamber of another embodiment of this invention.

The embodiment of this invention illustrated in FIGS. 4 and 5 is similar in many respects to the embodiment of FIGS. 1 through 3. Accordingly, like parts will be designated with the same reference characters. Basically the embodiment of FIGS. 4 and 5 is provided under circumstances where it is desired to form the axial openings 98 in the hub 88 of the impeller 86. Under such circumstances, it is important to prevent the weakening of the impeller hub. The embodiment of FIGS. 4 and 5 permits location of the axial openings 98 in the hub 88 and in addition serves to eliminate the critical milling operation required to seat properly the lower edge of the projection 76 (FIG. 2) on the surface 80 of the impeller 38. In this embodiment of the invention the impeller 86 is provided with a hub 88, upper and lower shrouds 90 and 92 respectively and impeller vanes 94. The flat surface 80 of the impeller 38 is not provided on the hub 86. In its stead there is formed a generally stepped configuration indicated by the reference character 96 having axial openings 98 extending between the steps 100 and 102 of the hub 88. The thrust ring 104 of this embodiment of the invention is shaped complementarily with respect to the stepped configuration 96 with its lower edge 106 being seated on the lower step 100 and its downwardly facing surface 108 being seated on the upper step 102. Radially extending openings 110 are formed in the thrust ring 104 and communicate at their inner ends with the axial openings 98 in the hub 88. The outer end of the openings 110 extend into the balancing chamber 47.

In this manner the critical milling operation necessitated in the FIGS. 1 through 3 apparatus by the fact that the radial openings are formed in the lower surface of the projection 76 is eliminated so that the complementary surfaces 100 and 106 are contiguous without necessitating the extremely delicate grinding procedure.

Figure 6:
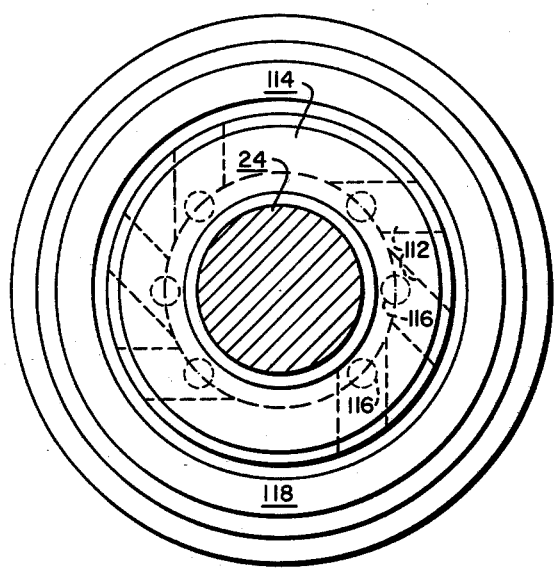
FIG. 6 is a top plan view of another impeller constructed in accordance with the principles of this invention; and, FIG. 7 comprises a number of graphical illustrations depicting the flow versus thrust curves for centrifugal pumps.

In the embodiment of this invention illustrated in FIG. 6 the radial openings 112 of the impeller thrust ring 114 are formed to communicate with axial openings 116 which extend through the hub of the impeller 118.. The radial openings 112 in this example of the invention do not form radii with respect to the axis of rotation of the shaft 24 but rather are angled forwardly with respect to such radii. The provision of the forward angled openings 112 produces a variable pressure rise over the pump flow range with the greater pressure rise occurring at the high flow range. Accordingly a greater thrust curve displacement at high flows is achieved. It is to be noted that the thrust curve displacements at high flow rates is an important aim of this invention.

The foregoing specification comprises a detailed description of illustrative embodiments of the instant invention. Many modifications may be made in the details of the embodiments without departing from the broad spirit and scope of this invention. Accordingly, it is specifically intended that the foregoing be interpreted in an illustrative, rather than a limitive sense.

I claim as my invention:

1. In a fluid pump, the combination comprising a pump casing having an intake and an outlet port, a pumping impeller having a hub portion and a shroud portion, radially extending vanes located in said impeller and disposed on said shroud portion, a rotatable shaft fixedly secured to said hub portion of said impeller and passing through an aperture in said pump casing, said pump casing having an impeller balancing chamber formed therein between said casing and said hub and shroud portions of said impeller, said balancing chamber being disposed to communicate with said aperture in said pump casing and with said casing outlet port, sealing means disposed between said balancing chamber and said casing aperture and said casing outlet port, a thrust ring fixedly secured to one of said hub and shroud portions and disposed in said balancing chamber, said thrust ring having a plurality of substantially radially extending openings therein, each having an inner end disposed closer to said hub portion than the outer end thereof, one of said hub and shroud portions having substantially axial openings therethrough with one end of each of said axial openings communicating with the interior of said impeller, the other ends of said axial openings communicating with the inner ends of said radial openings, said outer ends of said radial openings communicating with said balancing chamber.

2. In a fluid pump, the combination comprising a pump casing having an intake and an outlet port, a centrifugal pumping impeller having a lower shroud member and an upper shroud member, radially extending vanes disposed in said impeller between said shroud members, a rotatable shaft fixedly secured to the hub of said impeller and passing through an aperture in said pump casing, said pump casing having an impeller balancing chamber formed therein between said casing and said upper shroud of said impeller, said balancing chamber being disposed to communicate with said aperture in said pump casing and with said casing outlet port, sealing means disposed between said balancing chamber and said casing aperture and said casing outlet port, a thrust ring fixedly secured to said impeller and disposed in said balancing chamber, said thrust ring having a plurality of substantially radially extending openings therein, one end of said openings communicating with said balancing chamber, and the other end of said openings communicating with the interior of said impeller through axial openings extending through said upper shroud member, said substantially radial openings in said thrust ring being angled forwardly with respect to radii of the axis of rotation of said shaft.

3. In a fluid pump, the combination comprising a pump casing having an intake and an outlet port, a centrifugal pumping impeller, a rotatable shaft fixedly secured to the hub of said impeller, said pump casing having an impeller balancing chamber formed therein between said casing and said impeller, sealing means coupled to said balancing chamber to limit the flow of fluid therefrom, a thrust ring fixedly secured to said impeller and disposed in said balancing chamber, said thrust ring having a plurality of substantially radially extending openings therein, one end of said openings communicating with said balancing chamber, and the other end of said openings communicating with the interior of said impeller through axial openings extending through said impeller, said substantially radial openings in said thrust ring being angled forwardly with respect to radii of the axis of rotation of said shaft.

4. In a pumping unit, the combination comprising a pump casing, a rotatable shaft having one end thereof disposed in said casing and passing through an aperture therein, antifrictional means coupled to said shaft to facilitate rotation thereof, motive means for rotating said shaft, a centrifugal pumping impeller disposed in said casing, said casing and said impeller forming a balancing chamber for said impeller, and means for limiting the thrust on said bearings in one direction comprising an auxiliary centrifugal impeller member having its outlet communicating with the interior of said balancing chamber and its inlet communicating with the interior of said first mentioned impeller, said auxiliary impeller member being mounted on said first-mentioned impeller and being disposed in said balancing chamber.

5. In a fluid pump, the combination comprising, a pump casing, a centrifugal impeller rotatably mounted in said casing, said casing and said impeller forming a balancing chamber therebetween, said impeller including openings therein extending substantially parallel to the axis of rotation thereof, said opening extending between the fluid circulating portion of said impeller and said balancing chamber, a member fixedly mounted on said impeller and disposed in said balancing chamber, said member overlying the portions of said axial openings which open into said balancing chamber, and said member having openings therein extending laterally with respect to said axis of rotation and communicating between said portions of said axial openings and said balancing chamber, respectively.

References Cited in the file of this patent

UNITED STATES PATENTS

| 1,273,913 | Ostenberg | July 30, 1918 |
| 1,473,802 | Woock et al. | Nov. 13, 1923 |
| 2,390,504 | Berger | Dec. 11, 1945 |
| 2,799,227 | Allen | July 16, 1957 |
| 3,004,806 | Schinnerer | Oct. 17, 1961 |

FOREIGN PATENTS

| 223,691 | Germany | Oct. 23, 1908 |
| 968,742 | Germany | Mar. 13, 1958 |